(12) United States Patent
Jeanroy

(10) Patent No.: US 6,662,656 B2
(45) Date of Patent: Dec. 16, 2003

(54) GYROSCOPIC SENSOR

(75) Inventor: Alain Jeanroy, Conflans Sainte Honorine (FR)

(73) Assignee: Sagem S.A., Paris (FR)

( * ) Notice: Subject to any disclaimer, the term of this patent is extended or adjusted under 35 U.S.C. 154(b) by 0 days.

(21) Appl. No.: 10/203,386

(22) PCT Filed: Feb. 7, 2001

(86) PCT No.: PCT/FR01/00357
§ 371 (c)(1),
(2), (4) Date: Aug. 9, 2002

(87) PCT Pub. No.: WO01/61279
PCT Pub. Date: Aug. 23, 2001

(65) Prior Publication Data
US 2003/0010120 A1 Jan. 16, 2003

(30) Foreign Application Priority Data
Feb. 15, 2000 (FR) .............................. 00 01847

(51) Int. Cl.⁷ .............................. G01C 19/00

(52) U.S. Cl. .................... 73/504.02; 73/504.13
(58) Field of Search ................ 73/504.02, 504.13, 73/504.12

(56) References Cited

U.S. PATENT DOCUMENTS 5,712,427 A * 1/1998 Matthews ............... 73/504.04
5,889,358 A * 3/1999 Mori et al. ............... 310/348

* cited by examiner

*Primary Examiner*—Richard A. Moller
(74) *Attorney, Agent, or Firm*—Larson & Taylor PLC

(57) ABSTRACT

A gyroscopic sensor comprising: a sensing element (1) associated with detection and excitation electrodes (8); conductive rods (6) connected in particular to said electrodes (8); a protective housing (3, 4) enclosing the sensing element (1) and the electrode (8) and having insulating feed-throughs (7) for the conductive rods (6); and support means interposed between the housing (3, 4) and the sensing element (1) with the electrodes (8); the sensor being characterized in that said support means are constituted by the conductive rods (6) themselves, which are made so as to be elastically deformable.

5 Claims, 1 Drawing Sheet

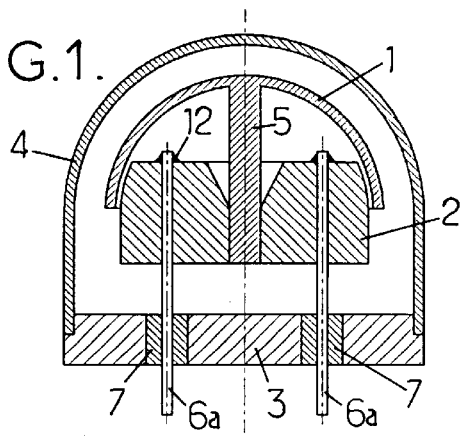
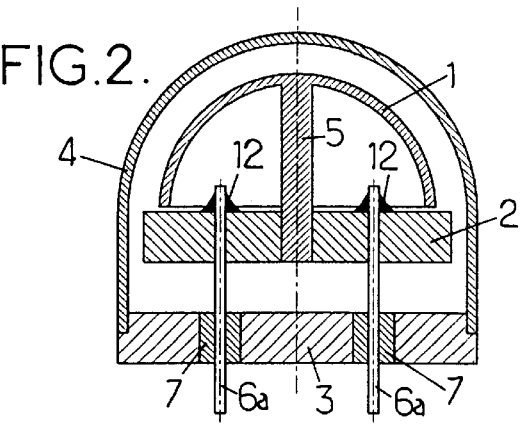
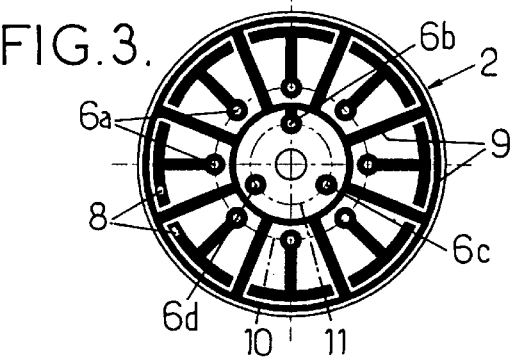
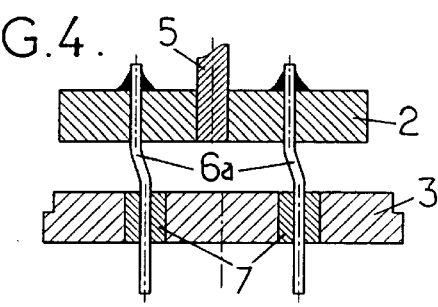
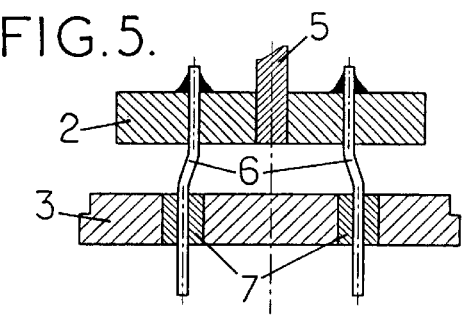
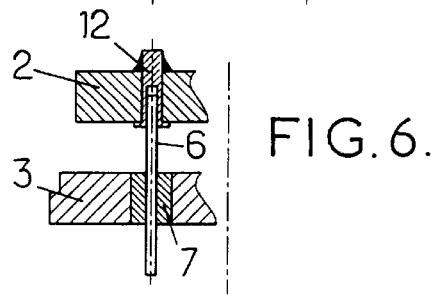

GYROSCOPIC SENSOR

The present invention relates to improvements applied to gyroscopic sensors comprising:
- a sensing element associated with detection and excitation electrodes;
- conductive rods connected in particular to said electrodes;
- a protective housing enclosing the sensing element and the electrode and having insulating feed-throughs for the conductive rods; and
- support means interposed between the housing and the sensing element with the electrodes.

In order to obtain good performance, gyroscopic sensors rely on component parts of accurate shape, and on assembly that is extremely accurate; this gives rise to dimensional tolerances that are very tight, and to clearances that are very small.

Unfortunately, it is possible for at least some such component parts to be made out of materials that are different, thereby leading to coefficients of thermal expansion that can be very different. This gives rise to considerable difficulties in ensuring that the gyroscopic sensor maintains the required performance under varying ambient temperature conditions, thus requiring assemblies that are suitable for allowing the component parts to expand where necessary, while still complying with precise values for clearances, spaces or air gaps, or complying with limit values for stress that can be accepted by the component parts.

Furthermore, the sensitive element of a gyroscopic sensor is a member that is extremely fragile and very sensitive to mechanical shock, so it is desirable for it to be supported while being decoupled as much as possible from mechanical shocks.

These difficulties arise, for example, in gyroscopic sensors where the sensitive element is a quartz resonator possessing one or more vibrating branches and having detection and excitation electrodes in the form of metallization deposited directly on said branches. In that type of embodiment, it is the piezoelectric nature of quartz that is used to implement the excitation and detection functions.

Those difficulties arise most particularly in gyroscopic sensors having a resonator in the form of a bell or a spherical cap, where such sensors are presently undergoing considerable development. In that type of resonator, the edge of the bell- or cap-shaped resonator is excited into a mode of vibration that causes it to be deformed with components that are both radial and tangential, and they also present a component of displacement that is parallel to the axis of the resonator. Thus, such gyroscopic sensors are known in which the radial vibration of the edge of the resonator is detected (in which case, the bell or cap of the resonator is positioned to cover an electrode-carrier plate at least in part, see, for example, U.S. Pat. No. 4,951,508), and gyroscopic sensors in which axial vibration is detected at the edge of the resonator (in which case, the electrode-carrier plate faces the edge of the bell or cap of the resonator, see, for example, FR 99/05204).

Known resonators of that type, which originally had diameters of about 60 millimeters (mm), have subsequently been developed so as to have diameters reduced to about 30 mm for high-performance space applications.

More and more, it is being envisaged to use gyroscopic sensors with bell-shaped resonators in applications requiring lower performance and at manufacturing cost that is much smaller, for example controlling tactical missiles. Such applications are often characterized by the need to place a sensor unit (gyroscopes and accelerometers) in a volume that is small, and in thermal and mechanical environments that are severe. Vibrating gyroscopes possess good qualities for such applications because of their small number of parts and their intrinsic robustness.

The key element for performance in a gyroscope having a bell-shaped resonator is the Q-factor of the resonator obtained by using silica to make the vibrating bell. At present, silica is the only material possessing the qualities required for making a resonator having Q-factors of an order of magnitude greater than several million.

Unfortunately, silica has a property which, while being favorable in terms of stability in gyroscope performance, nevertheless gives rise to a difficulty in manufacture: its coefficient of thermal expansion is extremely small, being of the order of 0.5 parts per million per degree Celsius (ppm/° C.). Gyroscopes are fixed on cores of metallic materials, often made of aluminum, having a coefficient of expansion of 23 ppm/° C. It is therefore necessary to use a special architecture in order to accommodate the transition between silica and the metal material of the core so that temperature variations do not disturb the operation of the gyroscope.

The resonator is used electrostatically with detection being capacitive, which, in order to be efficient, requires very small air gaps to be achieved (a few tens of micrometers ($\mu$m)). It is important to limit variations in air gap size as caused by differential expansion between materials and by deformation of the parts. Conventionally, this leads to using an assembly that possesses one degree of freedom (e.g. sliding in a plane as in the device of document U.S. Pat. No. 4,951,508), or to using parts that are elastic.

For the newly-envisaged applications implementing a bell-shaped resonator, the environments are becoming more and more severe: temperature range of −40° C. to +90° C., and the ability to withstand shock or impact giving rise to accelerations of several hundred times the acceleration due to gravity (g). Furthermore, the available volume is becoming smaller and smaller, which is leading to resonators in which the bell is of ever-decreasing diameter, which in present applications is about 20 mm, for example.

Under such conditions, conventional solutions are no longer suitable.

The object of the present invention is thus to propose a novel architecture for a gyroscopic sensor, in particular a sensor having a bell-shaped resonator, which ensures dimensional stability of the sensing elements of the gyroscope in thermal and/or mechanical environments that are severe and which, in particular, makes it possible to use bell-shaped resonators of small diameter as desired in practice.

To this end, the present invention provides a gyroscopic sensor as specified in the preamble which is characterized in that said support means are constituted by the conductive rods themselves, which are made so as to be elastically deformable.

For a gyroscopic sensor having a bell- or cap-shaped resonator, the sensor of the invention further comprises:
- a resonator in the form of a circular symmetrical bell or cap and possessing an axial fixing stem; and
- an electrode carrier carrying said detection and excitation electrodes and cooperating with the resonator, the electrode carrier carrying the resonator via its fixing stem;
- said protective housing containing the resonator and the electrode carrier;

and said conductive rods forming the support means are interposed between the electrode carrier and the housing.

By means of such an arrangement, the mechanical assemblies having load-bearing surfaces, which might rub against one another under the influence of external conditions (temperature, vibration, . . . ) thereby dissipating energy which would degrade the Q-factor of the resonator, and thus the precision of the gyroscope, have purely and simply been eliminated. The support function is now carried out by members (the conductive rods) that were already present and whose presence is, in any event, necessary for providing electrical connections to the resonator.

The dual function now carried out by the conductive rods makes it possible to eliminate causes that disturb proper operation of the gyroscope, enabling space to be saved by omitting members that are no longer needed, and thus making it possible to provide devices of smaller diameters, while also enabling the unit cost of such devices to be reduced.

Advantageously, with bell-shaped resonators, the conductive rods connected to the electrodes are distributed symmetrically and circularly around the axis of the resonator stem.

Also advantageously and under the same circumstances, the sensor may further comprise three conductive rods that are symmetrically distributed around the axis of the resonator, one of these rods being connected to a guard ring provided on the electrode carrier and another of these rods being connected to metallization of the resonator; the third conductive rod may serve merely to be present and contribute to supporting the electrode-carrier plate, where its presence makes it possible to avoid the electrode-carrier plate tilting relative to the gyroscope housing.

In a particular embodiment, the housing comprises a metal base and a cover secured thereto, and the base is provided with said insulating feed-throughs for the conductive rods.

Finally, the dispositions adopted in the invention lead to the following advantages:

the sensing element of the gyroscope is on a suspended mounting with a cutoff frequency that is easily adjustable, and it can move in translation parallel to the sensing axis of the gyroscope without this axis becoming tilted, which would be harmful for gyroscope accuracy;

the mount is suitable for use both with radial detection resonators and with axial detection resonators;

the mechanical and electrical connections are made by the same elements, thereby simplifying assembly and reducing cost;

deformations associated with shock or with localized temperature in the conductive rods do not affect the air gaps used in operating the resonator; and since the base of the gyroscope is made out of the same material as the gyroscope support, there are no temperature constraints in how the gyroscope is fixed.

This architecture is very well adapted to making free gyros, in particular those having small-sized bell-shaped resonators that are suitable for use in mechanical and thermal environments that are severe. It can also be used for gyroscopes of larger size, and in environments that are less severe, given that differential expansion is a problem that becomes increasingly difficult with increasing dimensions.

The invention will be better understood on reading the following detailed description of embodiments given purely as illustrative examples. In the description, reference is made to the accompanying drawing, in which:

FIG. 1 is a diagrammatic side view in section of an embodiment of a gyroscopic sensor having a bell-shaped resonator arranged in accordance with the invention;

FIG. 2 is a diagrammatic section in side view of another embodiment of a gyroscopic sensor having a bell-shaped resonator arranged in accordance with the invention;

FIG. 3 is a plan view of the electrode-carrier plate of the FIG. 2 resonator;

FIGS. 4 and 5 are fragmentary views showing the ability of the conductive rods of the gyroscopic sensors arranged in accordance with the invention to accommodate deforming forces; and FIG. 6 is a fragmentary view showing a variant embodiment of a portion of the gyroscopic sensors of FIGS. 1 and 2.

The description below relates more particularly to gyroscopic sensors having a bell-shaped or cap-shaped resonator, since the dispositions of the invention can be applied particularly advantageously in this type of gyroscopic sensor, particularly those fitted with a resonator of small diameter, it being nevertheless understood that these dispositions also apply to the support for the sensing element of any type of gyroscopic sensor.

With reference initially to FIGS. 1 and 2, a gyroscopic sensor having a bell- or cap-shaped resonator comprises four main elements:

a bell- or cap-shaped resonator 1, which can be hemispherical in shape in particular, as shown, and which possesses a fixing stem 5;

a part carrying the electrodes required for operating the resonator, referred to below as an electrode carrier 2, this part also having the resonator stem 1 anchored therein (the electrodes are not visible in FIGS. 1 and 2);

a base 3 enabling the gyroscope to be fixed on a support; and a cover 4.

The resonator 1 and the electrode carrier 2 are made of silica so as to ensure that the air gaps are stable, given that silica is a required material for the resonator.

The electrode carrier 2 can have various configurations. It can be hemispherical with electrodes facing the inside face of the resonator, as shown in FIG. 1. It can also be plane, with electrodes being placed facing the end edge surface of the resonator, as shown in FIG. 2.

The resonator 1 and the electrode carrier 2 are assembled together to form the sensing element of the gyroscope. The air gaps between these two parts are a few tens of $\mu$m. This subassembly is mechanically secured to the base 3 by support means. Thereafter, the cover 4 is installed so as to enable the resonator to operate in a secondary vacuum. Electrical connections 6 are established between the electrodes and the controlling electronics which is situated outside the gyroscope. These connections pass via leaktight feed-throughs 7 that are also electrically insulating and that are provided in the base 3.

In general, the base 3 is made of metal, having a coefficient of expansion which can either be close to that of silica, or else close to that of the material from which the support is made and on which the gyroscope is fixed. In either case, differential expansion will occur between the base 3 and one of the parts with which it is assembled. It is essential that the stresses induced by this differential expansion do not disturb the assembly comprising the resonator and the electrode carrier, whether by varying the air gap as a function of temperature or by generating stresses that are too great in the silica. The traction strength of silica is very weak compared with that of a metal.

In accordance with the present invention, in order to assemble the various component parts together, the above-mentioned support means are constituted by the above-mentioned electrical connections 6. In other words, once the above-mentioned component parts have been mechanically assembled together, it is the electrical connections 6 which serve to support the assembly comprising the resonator 1 and the electrode carrier 2 on the assembly constituted by the base 3 having the cover 4 secured thereto.

As shown in FIG. 3, the electrode-carrier part possesses various electrodes (e.g. eight electrodes in the example shown) constituted by thin metal deposits placed facing the resonator and enabling it to be operated. For the FIG. 1 resonator, the electrodes make use of radial deformation of the resonator. For the FIG. 2 resonator, they make use of axial deformation. These two configurations enable the same vibratory modes to be used. The mass of the sensing element made in this way is a few grams, because silica is used.

Referring to FIGS. 1 and 2 in conjunction with FIG. 3, the gyroscope base 3 is a circular part with eleven leaktight and insulating feed-throughs 7 having respective conductive rods 6 engaged therein suitable for providing the above-mentioned electrical connections:

eight rods 6a (shown in FIGS. 1 and 2) serve to conduct the signals from the electrodes 8 of the electrode carrier 2;

one rod 6b (not shown in FIGS. 1 and 2) connects to the guard ring 9 that separates the electrodes;

a rod 6c provides a connection (not shown) with the metallization of the resonator; and the last rod 6d does not have any electrical function; it serves solely to ensure that the electrode carrier remains in a stable orientation.

The eight rods 6a connected to the electrodes 8 are placed on a circle 10. The three additional rods 6b, 6c, 6d are placed concentrically (circle 11) inside the first eight rods, at the vertices of an equilateral triangle.

Each leaktight and insulating feed-through 7 is made in conventional manner by sealing a metal rod 6 in the base 3 using glass. The base 3 is made of the same material as the support on which the gyroscope is to be fixed.

The ends of the eleven metal rods 6 are fixed to the electrode carrier 2 by soldering (at 12) to the metal deposit made on the silica. This is equivalent to the electrode carrier 2 being mounted on "piles", which means that this part can move in translation parallel to the base 3. Such movement in translation is obtained by deforming the free portions of the metal rods 6. In the event of acceleration or shock parallel to the plane of the base 3, then deformation occurs as shown in FIG. 4. In the event of thermal expansion, then the deformation is as shown in FIG. 5.

By modifying the length and the diameter of the free portions of the metal rods 6, it is possible to adjust accurately the flexibility of the support so as to localize deformation in the metal rods and limit the amount of stress that is transmitted to the electrode carrier 2, whether under the effect of mechanical shock or under the effect of thermal expansion. Controlling the diameter and length of individual metal rods is easier than, for example, controlling the thickness of a continuous part having the same stiffness.

Thus, the resonator 1 and the electrode carrier 2 constitute a rigid assembly which is isolated from the outside by the suspension made using the metal rods 6. The resonant frequency of this suspension can be located between the maximum frequency of external vibration and the nominal operating frequency of the resonator 1, thereby filtering disturbances transmitted to the resonator. Similarly, in the event of the resonator being dynamically out of balance, the suspension will filter the transmission of energy to the outside.

The figures shown are not limiting. The connections between the metal rods 6 and the electrode carrier 2 can be made in various ways, for example by solder or by conductive adhesive. It is also possible to use intermediate inserts 12, e.g. made of Invar, which are fixed in the silica part, as shown in FIG. 6. The number of metal rods can be modified as a function of the number of electrodes or as a function of the internal connections made between the electrodes. It is necessary only to ensure symmetry that is as complete as possible so as to avoid the sensing element tilting relative to the base, and so as to ensure that movement takes place in the form of parallel translation, thereby conserving the direction of the inlet axis (measurement axis) of the gyroscope without giving rise to conical movements which cause a gyroscope to drift.

In the context of the present invention, the metal rods 6 must be made of a material or a set of materials that is not only a good conductor of electricity in order to perform the electrical conduction function, but that also possesses a good coefficient of elasticity so as to be capable of performing the mechanical support function under the required conditions as set out above. By way of example, rods made of an iron-nickel alloy or of an iron-cobalt alloy (e.g. the alloys sold under the reference VACON CF25 by Vacuumschelze GmbH) satisfy these two requirements.

What is claimed is:

1. A gyroscopic sensor comprising:

a sensing element associated with detection and excitation electrodes (8);

conductive rods connected in particular to said electrodes;

a protective housing enclosing the sensing element and the electrode and having insulating feed-throughs for the conductive rods (6); and support means interposed between the housing and the sensing element with the electrodes;

characterized in that said support means are constituted by the conductive rods themselves, which are made so as to be elastically deformable.

2. A gyroscopic sensor according to claim 1, characterized in that it comprises:

a resonator in the form of a circular symmetrical bell or cap and possessing an axial fixing stem; and an electrode carrier carrying said detection and excitation electrodes and cooperating with the resonator, the electrode carrier carrying the resonator via its fixing stem;

said protective housing containing the resonator and the electrode carrier; and in that said conductive rods forming the support means are interposed between the electrode carrier and the housing.

3. A gyroscopic sensor according to claim 2, characterized in that the conductive rods connected to the electrodes are distributed symmetrically and circularly around the axis of the resonator stem.

4. A gyroscopic sensor according to claim 2, characterized in that it further comprises three conductive rods that are symmetrically distributed around the axis of the resonator, one of these rods being connected to a guard ring provided on the electrode carrier and another of these rods being connected to metallization of the resonator.

5. A gyroscopic sensor according to claim 1, characterized in that the house comprises a metal base and a cover secured thereto, and in that the base is provided with said insulating feed-throughs for the conductive rods.

* * * * *